United States Patent [19]

Bäbler

[11] 4,272,298
[45] Jun. 9, 1981

[54] PROCESS FOR CONDITIONING A PIGMENT IN LIQUID AMMONIA

[75] Inventor: Fridolin Bäbler, Allschwil, Switzerland

[73] Assignee: Ciba-Geigy Corporation, Ardsley, N.Y.

[21] Appl. No.: 76,634

[22] Filed: Sep. 18, 1979

Related U.S. Application Data

[63] Continuation of Ser. No. 873,584, Jan. 30, 1978, abandoned.

[30] Foreign Application Priority Data

Feb. 3, 1977 [CH] Switzerland ............... 1317/77

[51] Int. Cl.³ ............... C09B 67/10; C09B 67/20; C09B 67/48; C09B 67/54
[52] U.S. Cl. ............... 106/309; 106/288 Q; 106/308 N; 260/152; 260/154; 260/157; 260/165; 260/176; 260/184; 260/187; 260/188; 260/208; 260/315; 260/317; 260/318; 260/326 A; 260/326 N; 542/423; 544/143; 544/215
[58] Field of Search ............... 260/208, 165, 152, 157, 260/176, 154, 184, 187, 315, 317, 318, 326 N, 326 A; 106/288 Q, 308 N, 309; 542/423; 544/143, 487; 546/58; 548/257

[56] References Cited

U.S. PATENT DOCUMENTS

| 3,016,384 | 1/1962 | Caliezi | 260/314.5 |
| 3,018,155 | 1/1962 | Gaertner et al. | 8/83 |
| 3,109,842 | 11/1963 | Schilling et al. | 260/157 |
| 3,328,384 | 6/1967 | Dietz et al. | 260/157 |
| 3,555,003 | 1/1971 | Ribka | 260/157 |
| 3,951,678 | 4/1976 | Wanser | 106/308 N |
| 3,976,649 | 8/1976 | Fabian et al. | 106/288 Q |
| 4,045,425 | 8/1977 | Hunter | 260/208 X |

FOREIGN PATENT DOCUMENTS

| 1263991 | 5/1961 | France | 106/309 |
| 44-50699 | 1/1969 | Japan | 260/157 |

OTHER PUBLICATIONS

Rys et al., "Fundamentals of the Chemistry and Application of Dyes", Wiley-Interscience, New York, pp. 2, 3, 160, 161, 192, 193 (1973).

Iwamoto et al., Chemical Abstracts, vol. 85, No. 22846n (1976).

Primary Examiner—Floyd D. Higel
Attorney, Agent, or Firm—Luther A. R. Hall; Harry Falber; Joseph F. DiPrima

[57] ABSTRACT

A process for conditioning a pigment or disperse dye which comprises treating the colorant with liquid ammonia and results in an improvement of the dyeing properties and may be accompanied by a conversion into another modification. The pigments afforded by the instant process are particularly suitable for pigmenting material of high molecular weight.

6 Claims, No Drawings

PROCESS FOR CONDITIONING A PIGMENT IN LIQUID AMMONIA

This is a continuation of application Ser. No. 873,584 filed on Jan. 30, 1978, now abandoned.

The invention relates to a process for conditioning a pigment or disperse dye by treating the colourant with liquid ammonia. The term "conditioning" is to be understood in this context as meaning, in addition to an improvement of the tinctorial properties, also a possible conversion into another modification.

Various processes for conditioning a pigment or disperse dye in order to improve the tinctorial properties are already known. One known method is to dissolve the colourant in an organic or inorganic solvent and to precipitate it again from the solution by crystallisation or precipitation. In the same way, organic solvents are used which do not dissolve the pigment, but produce the conditioning effects or modifications under the influence of time and temperature. Further known methods of conditioning are those in which the pigment is ground or kneaded.

Japanese published patent application 25526/76 for example describes a process for improving the tinctorial properties of an isoindolinone pigment, especially the colour strength, gloss and transparency, by dissolving the pigment in a mono- or dialkylamine, precipitating it in the form of the amine salt by the addition of water, cleaving the amine salt by heating, and separating the amine from the pigment again. In this process, the pigment is recovered in the starting modification. A change in the modification, for example of the linear quinacridone into the Y-modification, occurs however by treating the corresponding α-form in accordance with the process of Japanese published patent application 50699/65 with an aliphatic polyamine of the formula $NH_2(R-NH)_nH$, wherein R represents a linear saturated aliphatic radical and n is an integer from 1 to 3, at elevated temperature.

Compared with the process of Japanese published patent application 25526/76, the process of the present invention has the advantage that, without dissolving and precipitating the pigment beforehand with water after the treatment with liquid ammonia, another modification and improved application properties of the colourant are obtained only by evaporating the reagent; and the advantage compared with the process of Japanese published patent application 50699/65 consists of the fact that, for the treatment, liquid ammonia is used instead of a polyamine and elevated temperatures are not necessary in order to effect a conversion into another modification or to obtain improved application properties. It is surprising that, during the treatment with liquid ammonia, such conversions occur even at low temperatures up to $-77.7°$ C.

Preferably, the pigments or disperse dyes to be conditioned by the process of the present invention are those of the isoindolinone, azo, metal complex, quinophthalone and quinacridone series, and, in the case of the conversion into a modification, this latter can be either an already known or also a hitherto unknown modification.

In the treatment with liquid ammonia, which can be carried out optionally under elevated pressure and/or at elevated temperature, the colourant is suspended in the reagent and stirred therein. This procedure can take both hours and sometimes only minutes or seconds. In the conversion into a modification, the completion of the treatment is often detectable by the change in colour. The conditioned colourant is isolated by filtration and subsequent removal of the ammonia by evaporation or by direct evaporation thereof. Optionally, the colourant is partially or also completely dissolved in the reagent. In this case, the reagent is removed by direct evaporation, whereupon the dissolved colourant precipitates and is isolated. If the colourant is only partially dissolved, then filtration can first be carried out and the two colourant fractions isolated separately from the filter residue or the filtrate. Provided the presence of small amounts of water and/or organic solvents does not exert a negative influence on the conversion into the new modification, these substances can also be tolerated. However, the treatment is preferably carried out in the absence of water and/or an organic solvent. The treated pigments are often obtained in such microcrystalline form that they are amorphous in X-ray analysis. By increasing the size of the microcrystals, for example by after-treatment with organic liquids, they can be converted into a dimension in which the new modification can be detected by X-ray diffraction analysis.

When incorporated in lacquers, the products obtained according to the invention have an increased colour strength and gloss compared with the starting products. Furthermore, in the course of the treatment pigments can be obtained in a finer and more coarsely crystalline new, but unstable, modification, compared with the starting form. On account of this instability, the starting modification is obtained again on application, in fine or coarse crystalline form, depending on the mode of application. This can result in an increase in colour strength and gloss or in the hiding power.

The application properties of the pigments treated with ammonia, for example in respect of the wetting power on incorporation or the rheological properties, can often generally be improved. The pigments can be inorganic and organic pigments, for example of the class of azo, azomethine, anthraquinone, phthalocyanine, nitro, perinone, perylene, dioxazine, thioindigo, metal complex, quinophthalone, isoindolinone or quinacridone pigments.

To improve the texture of the colourants treated according to the invention, especially for incorporation in plastics, it is possible to use assistants. Instead of using pure liquid ammonia, it is possible for example to use a solution of a suitable assistant in the liquid ammonia. When the liquid ammonia is evaporated, this assistant precipitates and coats the pigment, thereby improving the dispersibility on application. Soluble resins or plasticisers, especially sulphonamides, can be used as suitable assistants in the liquid ammonia.

An improvement in the texture can also often be attained by carrying out the process such that, after the conversion, the liquid ammonia is only partially evaporated and the residual ammonia-pigment suspension is diluted by addition of an organic solvent or water and filtered and the pigment dried. If water is used as diluent, resinic acids can additionally be dissolved in the aqueous ammoniacal pigment suspension and the resin can be precipitated onto the pigment by spray drying or by acidification, which in turn results in an improvement in the texture.

The pigments are particularly suitable for pigmenting material of high molecular weight, for example cellulose ethers, such as ethyl cellulose, nitrocellulose, cellulose acetate, cellulose butyrate, natural resins or synthetic resins, such as polymerisation resins, polyaddition resins or condensation resins, for example aminoplasts, especially urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, singly or in mixtures. It is immaterial whether the above compounds of high molecular weight are in the form of plastic masses, melts or of spinning solutions, lacquers, paints or printing inks. Depending on the end-use, it is advantageous to use the pigments as toners or in the form of preparations.

Throughout the following Examples the parts are by weight, unless otherwise stated. The relationship between parts by weight and parts by volume is the same as that between the gram and the cubic centimeter. The starting pigments of the Examples are known compounds. Wherever it is not quite clear whether the modifications are hitherto unknown or known ones, they are designated A and B and C to distinguish the difference in the modifications.

EXAMPLES 1-19

A stirring vessel cooled with dry ice is charged with 10 parts of the colourant to be treated (see subsequent table) and about 120 parts by volume of liquid ammonia (from a pressure flask). The mixture is stirred until the conversion to the modification is complete, which takes about 4 to 60 minutes. The ammonia is then evaporated by heating and any traces still remaining are removed in vacuo at 100° C. The ammonia-free conditioned pigment is pulverised. In addition to the improvement in the tinctorial properties obtained by the conditioning, the treated pigments also show another, in many cases new, modification. This is evident from the changed X-ray diffraction spectra. The test of the application characteristics of the resulting modifications, which often exhibit a change in shade compared with the starting colourant, reveals in many cases colouristically interesting results and often a positive change in the application properties. This also applies in particular to those cases in which the modifications obtained by the treatment with ammonia are unstable, as illustrated in Examples 22 and 23.

| Example | Formula of the pigment | Modification of the starting pigment | Modification of the pigment treated with ammonia |
|---|---|---|---|
| 1 | [structure] | α | β hitherto unknown |
| 2 | [structure] | α | β hitherto unknown |
| 3 | [structure] | α | β hitherto unknown |
| 4 | [structure] | α | β hitherto unknown |
| 5 | [structure] | α | β hitherto unknown |
| 6 | [structure] | α | β hitherto unknown |

-continued

| Example | Formula of the pigment | Modification of the starting pigment | Modification of the pigment treated with ammonia |
|---|---|---|---|
| 7 | (structure: bis-isoquinolinone with NHOC bridge, Cl₄ substituents) | α | β hitherto unknown |
| 8 | (structure: triazine-linked bis-isoquinolinone with phenyl group, Cl₄ substituents) | α | β hitherto unknown |
| 9 | (structure: isoquinolinone with fused pyrimidine, Cl₄) | α | β hitherto unknown |
| 10 | (structure: bis-isoquinolinone azo-linked with OCH₃ substituent, Cl₄) | α | β hitherto unknown |
| 11 | (structure: benzimidazolone-NHOCCH-N=N- with Cl, CF₃ substituents, C=O, CH₃) | A | B |
| 12 | (structure: CF₃-phenyl-N=N-CHCOHN-benzimidazolone, C=O, CH₃) | A | B |
| 13 | (structure: COOH-phenyl-N=N-CHCOHN-benzimidazolone, CO, CH₃) | A | B |
| 14 | (structure: quinacridone-type) | β | α known |
| 15 | (structure: barbituric-azo-methylbenzimidazolone) | α | β hitherto unknown |
| 16 | (structure: dimethyl-benzoxazinone linked azo to benzimidazolone with CH₃, C=O) | α | β hitherto unknown |

| Example | Formula of the pigment | Modification of the starting pigment | of the pigment treated with ammonia |
|---|---|---|---|
| 17 | | α | β hitherto unknown |
| 18 | | α | β known |
| 19 | | α | β hitherto unknown |

EXAMPLE 20

10 parts of the greenish-yellow pigment of the formula

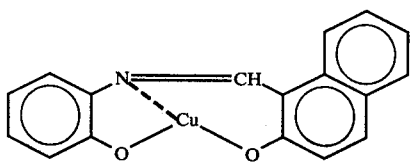

are treated in about 120 parts by volume of liquid ammonia by the process described in Example 1. X-ray diffraction analysis reveals that the resulting pulverised pigment has a different crystal modification compared with the starting form. When incorporated into plasticised PVC rolled sheets, the new modification gives colourations of better hiding power than the starting form. In addition to the change in crystal modification, the treatment in liquid ammonia produces a conditioning effect. Electron microscopic analysis confirms the enlarging of the crystals by the treatment with ammonia.

EXAMPLE 21

10 parts of the yellow pigment of the formula

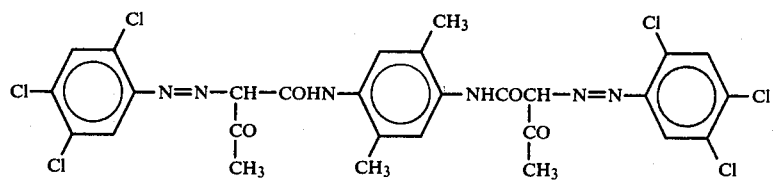

are stirred in an autoclave with 60 parts of liquid ammonia at 50° C. for 1 hour. The ammonia is evaporated off at temperatures above 30° C. (valve opening on the autoclave). Traces of ammonia still remaining are removed at about 100° C. in vacuo. X-ray analysis reveals that the resulting pulverised pigment has a crystal modification indentical to that of the starting form. However, when incorporated into plasticised PVC rolled sheets, the pigment treated with liquid ammonia gives a colouration of substantially greater hiding power and of excellent fastness properties. This property is attributable to the enlarging of the pigment crystals effected by the treatment with ammonia.

EXAMPLE 22

10 parts of the yellow isoindolinone pigment of the formula

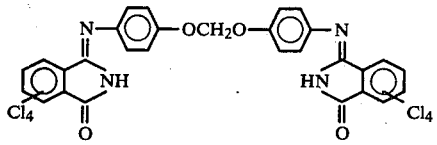

are treated in about 120 parts by volume of liquid ammonia by the process described in Example 1. X-ray analysis reveals that, compared with the starting form (α-modification), the resulting pigment has a different crystal modification, which shall be designated as β-modification. Further examinations then showed that the β-modification is unstable and, on application, is converted again into the more stable α-starting modification, which has excellent fastness properties. However, in comparison to the untreated pigment, lacquers coloured with the β-modification have a substantially higher colour strength while retaining the excellent fastness properties (reconversion into the α-modification). This effect is attributable to the fact that, in the conversion into the modification effected by the treatment with liquid ammonia, a comminution of the particle size has occurred. This can be confirmed by electron microscope photographs. The conditioning effect caused by the conversion of the modification in liquid ammonia is observed to be particularly marked when the pigment is incorporated in lacquers, especially when it is incorporated in metallic pigmented paints. Up to now it has not been possible to obtain analogous colourations of such high colour strength and with these fastness properties by conditioning the α-modification by the conventional known methods, for example grinding operations.

EXAMPLE 23

10 parts of the α-modification of the pigment used in Example 22 are well stirred in 120 parts by volume of liquid ammonia for 20 minutes, whereupon, as described in Example 22, it is converted into the fine-crystalline β-modification. The ammonia is then evaporated to a volume of about 30 parts by gently warming the stirring vessel. Then 100 parts by volume of methanol are cautiously added dropwise. The ammoniacal methanolic pigment suspension is well stirred for 30 minutes and the pigment is then filtered off and the filter cake washed with methanol and dried, affording the pigment in what X-ray analysis reveals to be the more stable α-modification.

The unstable, fine-crystalline β-modification was converted again into the stable α-modification by stirring it in methanol. The addition of solvent also effects a reduction in the reagglomeration of the pigment particles as occurs in the process variant described in Example 22. Not only is a high colour strength on incorporation in lacquers thereby attained, but also a good dispersibility when the conditioned pigment is incorporated in plastics.

EXAMPLE 24

7 parts of the yellow pigment of the formula

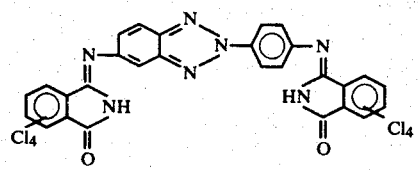

and 1.8 parts of Staybelite Resin are stirred together for about 20 minutes in about 100 parts by volume of liquid ammonia. By cautiously warming the stirring vessel, the ammonia is evaporated to a volume of about 30 parts. The pigment suspension is then diluted with 100 parts of water, stirred for 20 minutes, acidified with conc. hydrochloric acid at temperatures of 20° C., stirred for 10 minutes and filtered. The filter cake is washed neutral with water and dried. The pulverised pigment, which is coated with Staybelite Resin and reduced by the treatment with ammonia, gives very strong, bright yellow colourations when incorporated in lacquers and readily dispersible yellow colourations when incorporated in plastics.

EXAMPLE 25

10 parts of the yellow pigment of the formula

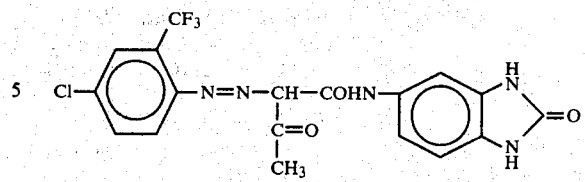

are treated in about 120 parts by volume of liquid ammonia by the process described in Example 1. X-ray and electron microscopic analyses of the resulting pigment reveal no change in modification, but a pronounced reduction in particle size. When incorporated for example in lacquers, it has in comparison to the starting pigment a substantially higher colour strength with equally good fastness properties.

EXAMPLE 26

10 parts of the C.I. pigment Orange 59 are treated with 0.5 parts of benzenesulphonic acid-N-methylamide (Dellatol MMA, available from Bayer), in about 120 parts by volume of liquid ammonia by the process described in Example 1. The benzenesulphonic acid N-methylamide dissolves in the liquid ammonia and precipitates on evaporation of the ammonia, coating the pigment particles.

When the resulting pigment is incorporated in lacquers it gives strong, yellowish orange colourations of excellent fastness properties as a consequence of the reduction in particle size during the treatment with ammonia.

EXAMPLE 27

(a) 10 parts of the orange pigment (A-modification) of the formula

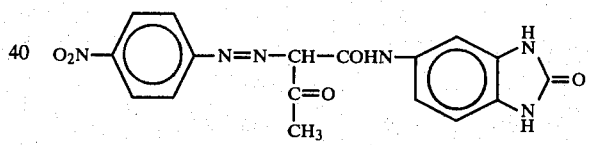

are treated in about 120 parts by volume of liquid ammonia by the process described in Example 1, yielding a pigment of extremely microcrystalline structure, so that most samples appear amorphous in X-ray analysis. In individual cases, lines present in the X-ray diagram indicate a different crystal modification (modification C) as compared with the starting pigment. Incorporation in an alkyd/melamine stoving enamel yields stronger colourations compared with the starting pigment.

(b) 5 parts of the pigment obtained in (a) are stirred in 60 parts by volume of o-dichlorobenzene for 18 hours at 160°–165° C., then filtered off and dried, yielding the pigment in a third crystal modification B. Incorporation of this modification in lacquers or plastics yields strong yellow colourations of good fastness properties.

(c) Repetition of the procedure described in (b), but using methanol instead of o-dichlorobenzene and stirring at reflux temperature, yields the pigment again in the A modification.

What is claimed is:

1. A process for conditioning an organic pigment selected from the group consisting of isoindolinone, azo, metal complex, quinacridone and quinophthalone pigments with liquid ammonia which comprises: (a)

treating the pigment with liquid ammonia in the absence of water or organic solvent; and (b) isolating the pigment by filtration and subsequent removal of the ammonia by evaporation or by direct evaporation of the ammonia.

2. A process according to claim 1, wherein the pigment is treated at elevated temperature and elevated pressure.

3. A process as claimed in claim 1, wherein the liquid ammonia contains a dissolved assistant which precipitates on evaporation of the ammonia.

4. A process for conditioning an organic pigment selected from the group consisting of isoindolinone, azo, metal complex, quinacridone and quinophthalone pigments with liquid ammonia which comprises: (a) treating the pigment with liquid ammonia in the absence of water or organic solvent; (b) partially evaporating the ammonia to form a pigment suspension; (c) diluting the suspension with an organic solvent or water; and (d) isolating the pigment by filtration and subsequent removal of the ammonia, organic solvent or water.

5. A process according to claim 4, wherein the pigment is treated with ammonia and resinic acid.

6. A process as claimed in claim 1, wherein the treatment is carried out in the presence of a benzenesulphonic acid N-methylamide.

* * * * *